United States Patent [19]

Miller

[11] Patent Number: 5,278,356
[45] Date of Patent: Jan. 11, 1994

[54] HOLD-DOWN TAPE FOR ELECTRICAL CABLES

[76] Inventor: Terry Q. Miller, 10195 Maymie Rd., Boise, Id. 83703

[21] Appl. No.: 693,952

[22] Filed: Apr. 29, 1991

Related U.S. Application Data

[63] Continuation-in-part of Ser. No. 535,358, Jun. 8, 1990, abandoned.

[51] Int. Cl.$^5$ .......................... B32B 7/14; H01B 7/18; H01B 7/28
[52] U.S. Cl. ................... 174/117 A; 428/76; 428/194; 428/202; 428/343
[58] Field of Search ............... 428/194, 200, 343, 202, 428/195, 906, 76, 35.5; 174/117

[56] References Cited

U.S. PATENT DOCUMENTS

| | | |
|---|---|---|
| 732,889 | 7/1903 | Paver .................. 174/117 A |
| 2,510,120 | 6/1950 | Leander ................ 428/343 X |
| 2,673,643 | 3/1954 | Blank et al. ............ 428/194 X |
| 3,253,085 | 5/1966 | Stern .................. 174/117 A |
| 3,832,598 | 8/1974 | Oehmke et al. ......... 174/117 A X |
| 4,465,717 | 8/1984 | Crofte et al. ............ 428/40 |
| 5,008,489 | 4/1991 | Weeks, Jr. et al. ...... 174/117 A X |

FOREIGN PATENT DOCUMENTS

| | | | |
|---|---|---|---|
| 2026440 | 5/1970 | Fed. Rep. of Germany ... | 174/117 A |
| 2052271 | 10/1970 | Fed. Rep. of Germany ... | 174/117 A |
| 2418973 | 11/1979 | France .................. | 174/117 A |
| 1601000 | 11/1977 | United Kingdom .......... | 174/117 A |

OTHER PUBLICATIONS

*Electronic Musician*, Sep. 1990, p. 16.
Scotchflex® Cable Clips and Cable Duct Aug. 11, 1969.

*Primary Examiner*—Daniel Zirker
*Attorney, Agent, or Firm*—Thorpe, North & Western

[57] ABSTRACT

A cable hold-down tape includes an elongate, flexible piece of material whose underneath side edges are provided with adhesive, with a central section extending the length of the tape being adhesive free. The tape is employed to hold a cable on a support surface by positioning the tape lengthwise along the top of the cable, with the central section of the tape being in contact with the cable and the side edges of the tape containing adhesive adhering to the support surface on either side of the cable.

4 Claims, 1 Drawing Sheet

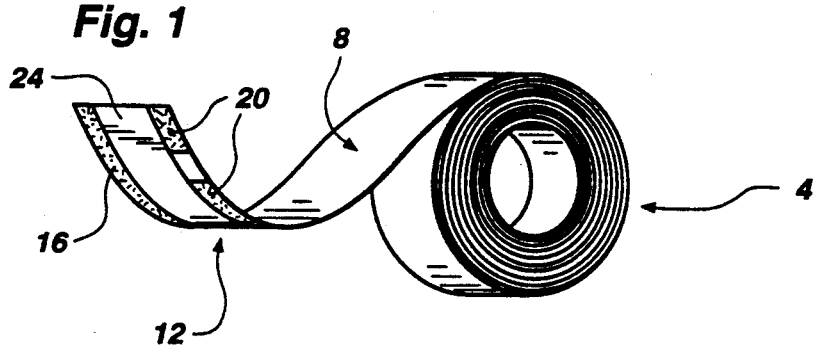
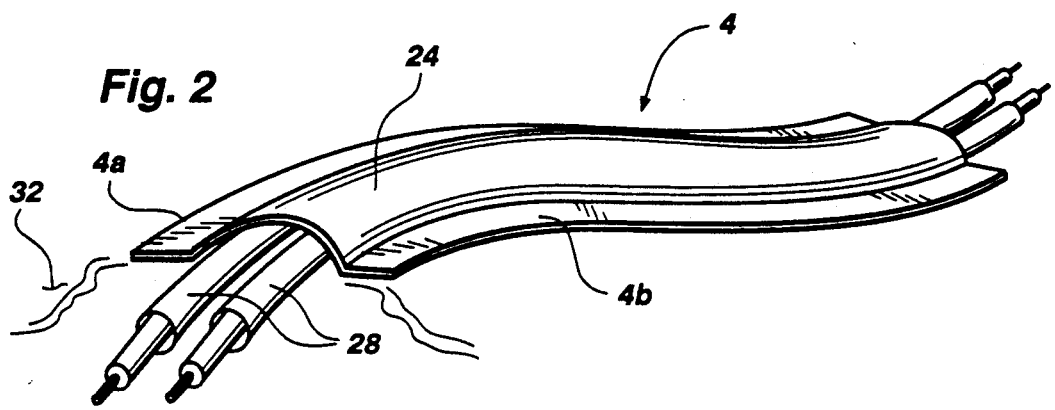
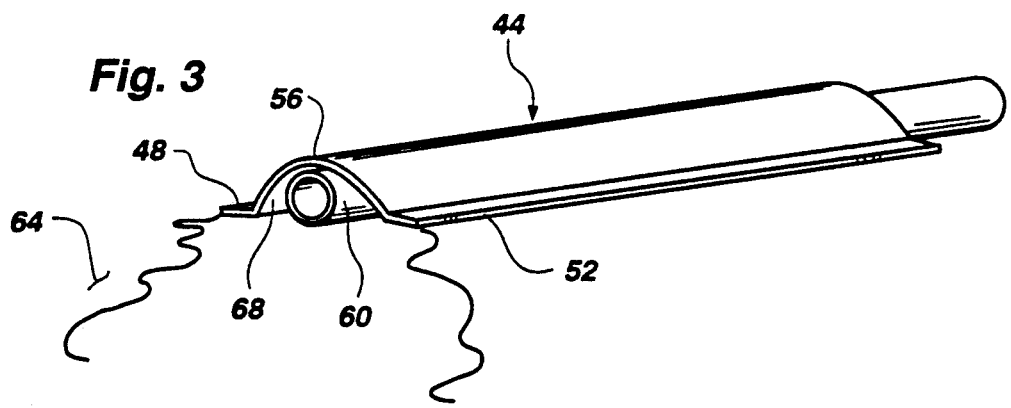
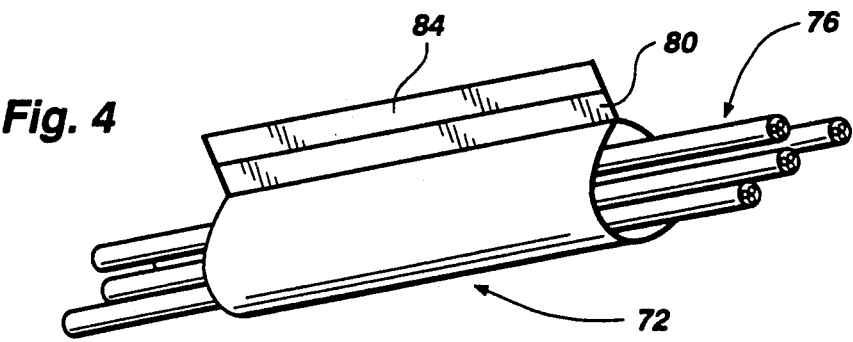

HOLD-DOWN TAPE FOR ELECTRICAL CABLES

This is a continuation-in-part of application Ser. No. 07/535,358 filed Jun. 8, 1990 now abandoned.

BACKGROUND OF THE INVENTION

This invention relates to a cover structure and method for securely holding electrical cables and the like on a support surface or in a bundle.

In the entertainment and communication businesses, electrical equipment, such as cameras, lighting, sound equipment, etc., is typically utilized which requires electrical power for their operation and thus electrical cables for carrying the power from power sources to the equipment. It is not uncommon when using such equipment to run the electrical cable some distance over floor space to facilitate use of the equipment, and such cable is oftentimes maintained in place on the floor by conventional adhesive or, more often, duct tape. The purpose for this is to secure the cable in locations to minimize the chance of someone tripping over the cable and also to prevent damage to the cable.

When it comes time to move equipment such as described above, it is necessary to pull up the tape holding the cable to the floor and this oftentimes leaves a sticky and gummy residue on the cable from the tape used. This of course results in unsightly looking cable, and more difficult and messy handling of the cable during the next use of the equipment unless the sticky and gummy residue is first removed--this of course would require time for cleaning, very probably with a special cleaning solution.

Another problem with holding electrical cable and the like in place on a support surface with conventional tape is that the tape is used only at certain locations along the length of the cable, and so those portions of the cable not being held by tape are still free to move and shift and thus still pose a hazard to people walking in the area.

An alternative to the use of conventional tape to hold the cables in place involves the use of a substantially rigid, elongate bridge cover which extends along and over a cable for some length of the cable. Such covers are suitable for covering substantial lengths of cable, but the covers simply rest on the support surface and are not adhesively attached thereto, and so they may easily shift or move if bumped. Further, the covers cannot be bent or molded into desired shapes to accommodate a variety of cable path configurations, but rather can only be used to cover a cable which lies in a path whose shape coincides to that of the cover.

SUMMARY OF THE INVENTION

It is an object of the invention, in view of the above-described prior art deficiencies, to provide a hold-down tape or cover and method for securing electrical and mechanical cables and the like to a support surface or together without leaving a sticky adhesive residue on the cables.

It is also an object of the invention, in accordance with one aspect thereof, to provide such a tape or cover which may be configured to cover substantially any pathway traversed by a cable to be held on a support surface.

It is an additional object of the invention to provide such a tape or cover suitable for holding a cable or the like on a support surface substantially along the length of the cable.

The above and other objects of the invention are realized in a specific illustrative embodiment of a tape and method for holding down electrical and mechanical cables and the like on a support surface, where the tape includes a thin, elongate strip of flexible material having top and bottom surfaces and including adhesive disposed on the bottom surface at the side edges of the strip for attaching the tape to the surface. A center section of the strip extending the length thereof on the bottom surface is free of adhesive.

In use, the tape is placed over a cable to be held on a support surface so that the center section contacts the cable and the side edges contact and adhere to the support surface to hold the cable in place. Since only the center section of the tape, containing no adhesive, contacts the cable, upon removal of the tape from over the cable, no sticky or gummy residue is left on the cable.

BRIEF DESCRIPTION OF THE DRAWINGS

The above and other objects, features and advantages of the invention will become apparent from a consideration of the following detailed description presented in connection with the accompanying drawings in which:

FIG. 1 is a perspective view of a roll of hold-down tape made in accordance with the principles of the present invention;

FIG. 2 is a perspective view of a section of the tape of FIG. 1 shown holding a pair of cables against a support surface;

FIG. 3 shows a perspective view of a semi-flexible cover for covering and holding down cables, in accordance with the principles of the present invention; and FIG. 4 shows a perspective, fragmented view of another use of the tape shown in FIGS. 1 and 2, to gather and hold cables together and to a support surface.

DETAILED DESCRIPTION

Referring to FIG. 1, there is shown a roll of flexible tape 4 suitable for use in securing electrical and mechanical cables, wires, conduits and similar elongate objects to a support surface. The tape is formed of a thin, elongate strip of flexible material having a top adhesive-free surface 8 and a bottom adhesive-bearing surface 12. Disposed on the bottom surface 12 is a conventional adhesive shown positioned in a continuous strip 16 at one side edge, and at spaced-apart locations 20 at the other side edge. Disposed between the two side edges containing adhesive is a central adhesive-free section 24. The tape of FIG. 1 is shown with the continuous strip of adhesive 16 and the intermittent strips 20 for purposes of illustration as to how the adhesive might be applied to the bottom surface 12 of the tape 4. That is, continuous strips of adhesive could be positioned at both side edges on the bottom surface of the tape, or intermittent strips could likewise be positioned at both side edges. The adhesive is a releasable adhesive which would adhere to a surface, but also allow for removal of the tape from the surface.

Use of intermittent strips of adhesive would allow for easier removal of the tape from a support surface, as will be discussed momentarily, while use of continuous strips would provide a somewhat more secure holding of a cable on the support surface, as will also be discussed momentarily.

The tape 4 might illustratively be made of any suitable flexible synthetic or natural material such as vinyl and other flexible plastics or woven fabric. The adhesive 16 and 20 might illustratively be composed of acrylic adhesive, latex adhesive, rubber-based adhesive, or other conventional adhesives such as used for example with pressure sensitive tape, i.e., conventional duct tape, masking tape, etc. All such adhesives generally allow for adhering the tape to a surface, but will release the tape when it is pulled up.

FIG. 2 shows the tape 4 positioned to bridge over and extend lengthwise with a pair of cables 28. Side edges 4a and 4b of the tape are placed in contact with a support surface 32 to adhere thereto, while the central section 24 bridges over, contacts and holds down the cables 28. Since the central section 24 includes no adhesive, and since the central section is the only part of the tape in contact with the cables 28, no adhesive from the tape comes in contact with the cables and of course none can thus remain on the cables when the tape is removed. Since the tape is flexible and bendable, it can be manipulated to coincide and overlay curving or other irregular pathways followed by cables. Advantageously, the width of the adhesive strips is significantly less than the width of the non-adhesive portion, e.g., for a tape width of about 4 inches, the width of each adhesive strip would advantageously be about ½ inch or about 1/6 the width of the non-adhesive portion, to allow for collecting and holding a number of cables without having the cables contact the adhesive portions.

FIG. 3 shows another embodiment of the cable cover of the present invention. This embodiment includes a strip of material 44 having a bridge cross section with two spaced-apart feet 48 and 52 and a central or roof section 56 extending from the top of one foot to the top of the other foot to bridge over a cable 60 which is to be held in place on a surface 64. Advantageously, the feet 48 and 52 and central roof section 56 are integrally formed. As shown in FIG. 3, the feet 48 and 52 and central roof section 56 combine to form an arcuate upper surface area, and to define a tunnel 68 in which the cable 60 is disposed.

Disposed on a bottom surface of the feet 48 and 52 is adhesive for contacting the support surface 64 to secure the cover 44 thereagainst in a manner similar to that of the FIG. 2 embodiment. Provision of the adhesive allows for more securely positioning the cover 44 on a support surface so that it can generally resist sliding or other movement to thereby more securely hold the cable 60 in place. Advantageously the cover 44 is made of a semi-flexible plastic such as polypropylene, vinyl or polyethylene. The adhesive coated on the bottom surface of the feet 48 and 52 might illustratively be those mentioned earlier for the tape embodiment. Cover strips of plastic could be removably placed over the adhesive on the feet 48 and 52 until the time of use of the cover 44. The cover 44 would typically be used for a more permanent positioning of cables.

FIG. 4 shows another use of the tape of FIGS. 1 and 2 whereby a length of tape 72 is wrapped about a bundle of cables 76 so that the adhesive on one side 80 of the tape contacts and adheres to a section of the other side of the tape running parallel with an adhesive strip 84 on the other side. Joining the side edges of the tape 72 in this fashion about the cable bundle 76 leaves adhesive strip 84 exposed to allow the strip to contact and adhere to a surface against which the cables are to be held.

If it is simply desired to hold the cable 76 in a bundle, then the adhesive strips on opposite sides of the tape could simply be placed in contact with one another so that there was no exposed adhesive (and so the tape and bundle could not be attached to any surface).

In all embodiments of the invention, the cables will typically be placed in position adjacent to one another at their desired location, and then the tape or cover would be positioned either to bridge over the cables and adhere to a surface (as shown in FIGS. 2 and 3) or to wrap about the cables for maintaining them in a bundle to then attach them to a surface with the exposed adhesive or simply leave them bundled but unattached (FIG. 4).

In the manner described, a tape or cover having adhesive at spaced-apart under surface side edges, with a central adhesive-free section, can be placed to hold electrical and mechanical cables and the like in a bundle and on a support surface, without any adhesive contacting the cables to leave a sticky or gummy residue thereon. The tape or cover can be easily placed over the cable and removed from thereover when finished.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A cable cover for retaining cables in place on a support surface, the cable cover consisting essentially of an elongate strip of material having a bridge cross-section with two spaced-apart feet, each foot comprising a thin elongate strip of material having an upper and lower surface, and an elongate non-adhesive central section arching from one foot to the other, said cover further comprising a releasable adhesive disposed on the lower surfaces of said feet to cause the feet to adhere to a surface on which the cover is placed and which does not leave a gummy residue on the cables or the support surface when removed from the same, so that the cover may be securely positioned over a cable lying on the support surface with the feet of the cover positioned on either side of the cable and the central section bridging over the cable, the central section being substantially wider than the adhesive placed on either of said two feet.

2. A cable cover as in claim 1 wherein said material is flexible.

3. A cable cover as in claim 2 wherein said material is resilient.

4. A cable cover as in claim 1 wherein said feet are made of a soft compressible, resilient material.

* * * * *